United States Patent

Wiman

Patent Number: 5,423,639
Date of Patent: Jun. 13, 1995

[54] CUTTING INSERT FOR CHIPFORMING MACHINING OF WORKPIECES

[75] Inventor: Jörgen Wiman, Sandviken, Sweden

[73] Assignee: Sandvik AB, Sandviken, Sweden

[21] Appl. No.: 53,265

[22] Filed: Apr. 28, 1993

[30] Foreign Application Priority Data

Oct. 28, 1992 [DE] Germany .................. 9214563 U

[51] Int. Cl.⁶ .................. B23B 27/08; B23B 27/22
[52] U.S. Cl. .................. 407/116; 407/117
[58] Field of Search .................. 407/114, 115, 116, 117

[56] References Cited

U.S. PATENT DOCUMENTS

| | | | |
|---|---|---|---|
| 3,815,191 | 6/1974 | Holma | 407/114 |
| 4,629,372 | 12/1986 | Huston | 407/116 |
| 4,776,733 | 10/1988 | Pettersson | 407/114 |
| 4,778,311 | 10/1988 | Niemi | 407/116 |
| 4,969,779 | 11/1990 | Barten | 407/114 |
| 4,973,204 | 11/1990 | Mihic | 407/116 |
| 4,992,008 | 2/1991 | Pano | 407/115 |
| 5,135,336 | 8/1992 | Noguchi et al. | 407/117 |

*Primary Examiner*—William E. Terrell
*Attorney, Agent, or Firm*—Burns, Doane, Swecker & Mathis

[57] ABSTRACT

A cutting insert for chip forming machining of workpieces is disclosed. The insert includes at least one end-positioned cutting head having an upper surface with a cutting edge extending across the width of the cutting insert and the ends of the cutting edge adjoining front chip surface side portions. A chip-deforming depression is provided between the front chip surface side portions. The rake angle of the chip surface side portions is consistently negative while the rake angle of a surface of the depression adjacent the cutting edge is consistently positive.

9 Claims, 2 Drawing Sheets

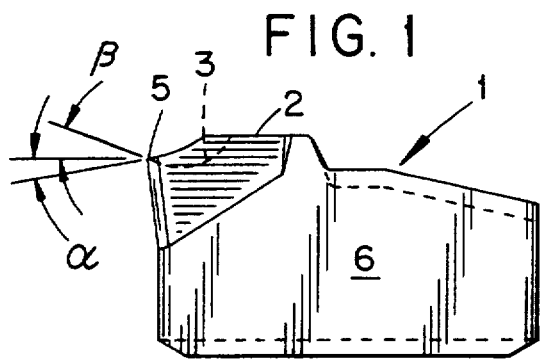
FIG. 1
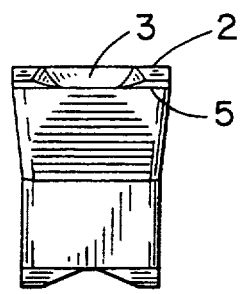
FIG. 4
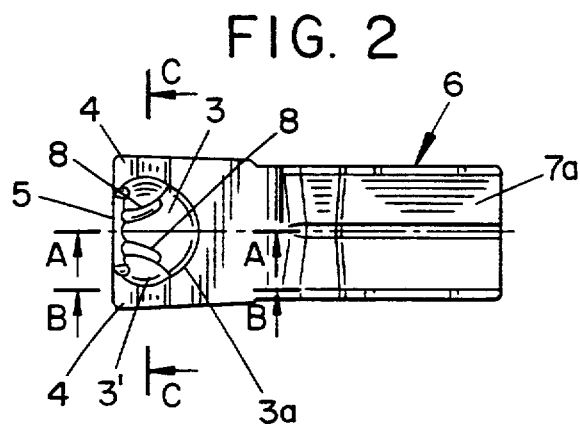
FIG. 2
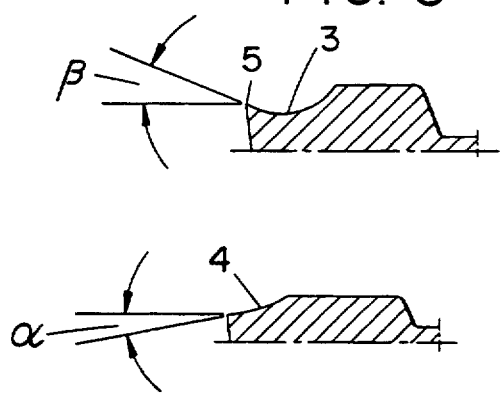
FIG. 5
FIG. 6
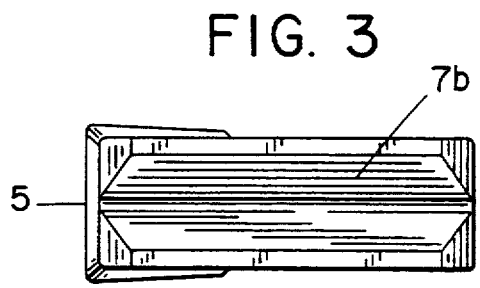
FIG. 3
FIG. 7

CUTTING INSERT FOR CHIPFORMING MACHINING OF WORKPIECES

BACKGROUND AND SUMMARY OF THE PRESENT INVENTION

The present invention relates to improved cutting inserts for grooving and parting off tools with a holder and a replaceable cutting insert.

Grooving and parting off tools serve as turning tools in lathes for effecting grooving and parting off operations. During these operations, the grooving and parting off tool is radially moved towards the workpiece, while the latter is not submitted to any axial movement. In this way a groove is formed in the workpiece, and eventually the workpiece is cut off, when the groove reaches the axis of rotation. Due to obvious reasons, the groove should have a small width for the parting off operation. Therefore, the cutting insert also is narrow. The same is also true for the part of the tool holder that is introduced into the groove during machining, i.e., the support blade. This blade is usually made even thinner than the cutting insert, in order to keep the blade away from the walls of the groove.

The cutting insert comprises a front cutting head and a rear clamping part for clamping the cutting insert in the support blade.

Several cutting inserts of this type are known. As examples can be mentioned SE-B-377 771, SE-B-454 060, SE-B-461 635, U.S. Pat. No. 4,969,779 and U.S. Pat. No. 5,135,336. All of these references belong to the same art as the present invention, i.e., to cutting inserts for grooving and parting off operations. Furthermore, they all comprise a recess or depression on the chip surface, so that the chips intrude into this recess and, seen in a cross-section of a chip, curve into the recess, thus decreasing the width of the chip and rendering the chip smaller than the width of the groove.

Although the known cutting inserts usually work satisfactorily, they are marred by a few inconveniences. Thus, the combined knowledge of the prior art supports the theory that the difference between the chip-breaking angle over the depression and the corresponding angle over the side surfaces of the depression is too slight. This small angle may cause too insignificant a deformation of the chips, which, in turn, can result in chip jamming and damaging of the groove surfaces. Moreover, the zero-degree or positive rake angles of the exposed side parts of the cutting edge, at both sides of the depression, occasionally cause untimely wearing out and splintering of these side parts.

Eventually, cutting inserts comprising a depression which intersects the cutting edge create an uneven bottom surface of the groove at grooving operations, which is undesireable or unacceptable for several applications. Naturally, this vaulted deformation of the groove bottom is exaggerated as the diameter of the groove bottom is smaller.

Hence, an object of the present invention is to construct a cutting insert which brings about a safe and sufficient decrease of the chip width and causes short chips, and which comprises strong side part cutting edges. A further object of the present invention is to provide a cutting insert that will produce an even and smooth groove bottom surface.

According to the present invention, these objects and others are realized by providing the side chip surfaces with a consistently negative rake angle, and providing the side of the chip-forming depression next to the cutting edge with a consistently positive rake angle.

BRIEF DESCRIPTION OF THE DRAWINGS

The present invention will now be more clearly described in connection with the appended drawings, wherein like members bear like reference numerals and wherein:

FIG. 1 is a side view of the cutting insert according to the present invention;

FIG. 2 is a plan view from above of the cutting insert of FIG. 1;

FIG. 3 is a plan view from below of the cutting insert of FIG. 1;

FIG. 4 is a front view of the cutting insert of FIG.

FIG. 5 is a sectional view along the line A—A in FIG.

FIG. 6 is a sectional view along the line B—B in FIG. 2, parallel with the section of FIG. 5;

FIG. 7 is a sectional view along the line C—C in FIG.

DETAILED DESCRIPTION OF THE PREFERRED EMBODIMENTS

Figure 8:
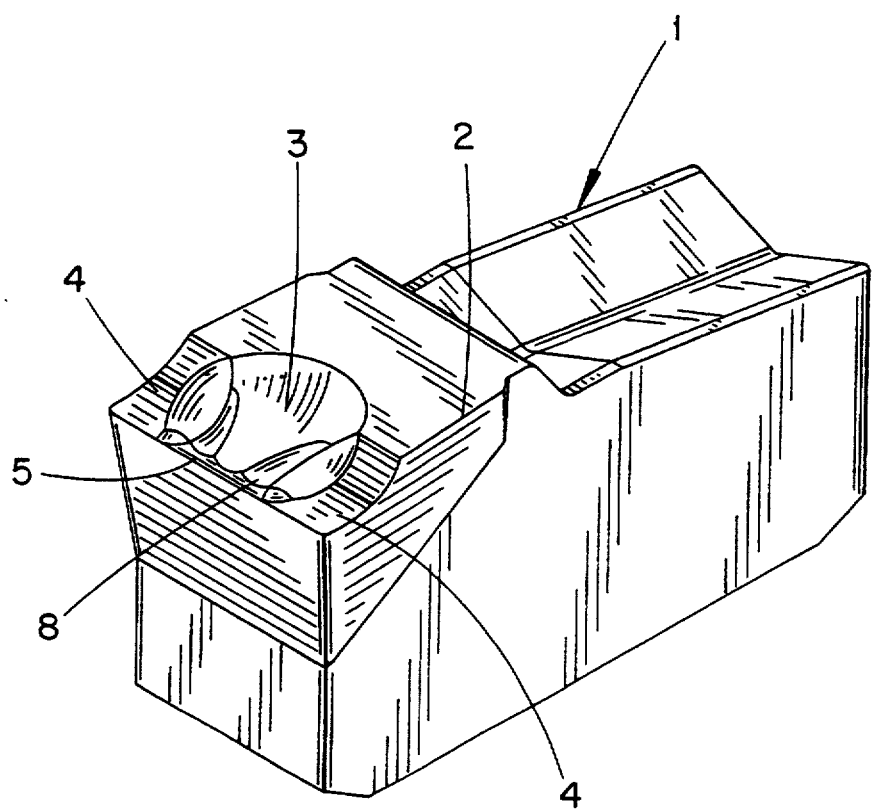
FIG. 8 is a right front perspective view of the insert according to the present invention

FIG. 1 and 8 show a cutting insert 1, preferrably of hard metal, with a prismatically shaped shank 6 that has abutting surfaces 7a and 7b. These abutting surfaces are arranged to cooperate with corresponding prismatic abutting surfaces on a support blade (not shown), for clamping and gripping the cutting insert in a way known in the art.

At the top of the front of the insert 1 is the cutting edge 5, which runs rectilinearly and continuously across the width of the cutting insert 1. A depression or recess 3 is provided which lies in its entirety behind the cutting edge 5. Starting from the cutting edge 5, the depression 3 initially widens somewhat and then narrows and finally ends by adjoining the upper surface of a back wall 3a to terminate at top surface 2 in the illustrated embodiment. Other shapes of the depression and the final backwall are also possible and are included within the scope of the present invention.

On the sides of the depression and adjacent to the cutting edge 5 are the chip surface side portions 4. In order to strengthen the end parts of the cutting edge and to magnify the difference between the two adjacent rake angles, the chip surface side portions 4 are formed with a negative rake angle $\alpha$. This angle e can be between $-6°$ and $-20°$, preferrably between $-8°$ and $-15°$ (FIGS. 1 and 6).

The rake angle $\beta$ of the depression 3 is positive. Useful angles for the rake angle $\beta$ are within the range from $+6°$ to $+25°$, preferrably from $+10°$ to $+15°$ (FIGS. 1 and 5) Thus, there is a difference between adjacent rake angles $(\alpha+\beta)$ of between 16° and 45°. This large angle difference represents an essential feature of the present invention. By this feature, surprisingly high and safe values of chip width narrowing are achieved, as well as short chips which fall quickly and safely into the chip basket.

In order to minimize the contact area between the chip and the chip surface (in this case the surface of the depression 3), the depression surface can be provided with minute ribs 8. By positioning these ribs 8 according to FIG. 2, the ribs delimit secondary side depressions 3' between the depression 3 and the chip surface side portions 4 to further enhance chip formation and removal.

The principles, preferred embodiments and mode of operation of the present invention have been described in the foregoing specification. However, variations and changes may be made without departing from the spirit of the present invention. All such variations and changes that fall within the spirit and scope of the appended claims are intended to be embraced thereby.

What is claimed is:

1. Cutting insert for chip-forming machining of workpieces, said insert comprising a body with a cutting head at one end thereof, the cutting head including a front surface, a top surface, and an upper surface, with a cutting edge being formed at the intersection of said front and upper surfaces, said cutting edge extending across the width of the cutting insert, the upper surface including a front chip surface side portion at each side thereof and a chip-deforming depression provided between and extending below the level of the chip surface side portions, the chip surface side portions comprising respective surfaces extending continuously from the cutting edge to the top surface near a rearmost extension of the depression, at rake angles consistently negative relative to a plane through the cutting edge, and the rake angle of a surface of the depression immediately adjoining the cutting edge between the chip surface side portions being consistently positive relative to said plane.

2. The cutting insert according to claim 1, wherein, the width of the depression, starting from the cutting edge, initially grows larger and then the width narrows and terminates into the upper surface.

3. The cutting insert according to claim 1, wherein the rake angle of the chip surface side portion is within the range of $-6°$ to $-20°$.

4. The cutting insert according to claim 1, wherein the rake angle of the front part of the chip surface side portion is within the range of $-8°$ to $-15°$.

5. The cutting insert according to claim 1, wherein the rake angle of the surface of the chip-forming depression adjacent to the cutting edge is within the range $+6°$ to $+25°$.

6. The cutting insert according to claim 1, wherein the rake angle of the surface of the chip forming depression adjacent to the cutting edge is within the range of $+10°$ to $+15°$.

7. The cutting insert according to claim 1, further comprising ribs arranged on the surface of the depression, said ribs delimiting side depressions between the chip surface side portions and the depression.

8. The cutting insert according to claim 2, further comprising ribs arranged on the surface of the depression, said ribs delimiting side depressions between the chip surface side portions and the depression.

9. The cutting insert according to claim 1, wherein the difference between the rake angle of the chip surface side portions and the rake angle of the surface of the depression is within the range of $16°$ to $45°$.

* * * * *